(12) United States Patent
Gong et al.

(10) Patent No.: US 12,056,944 B2
(45) Date of Patent: Aug. 6, 2024

(54) EFFICIENT AND ROBUST HIGH-SPEED NEURAL NETWORKS FOR CELL IMAGE CLASSIFICATION

(71) Applicant: SONY GROUP CORPORATION, Tokyo (JP)

(72) Inventors: Liyu Gong, Lexington, KY (US); Ming-Chang Liu, San Jose, CA (US)

(73) Assignees: SONY GROUP CORPORATION, Tokyo (JP); SONY CORPORATION OF AMERICA, New York, NY (US)

( * ) Notice: Subject to any disclaimer, the term of this patent is extended or adjusted under 35 U.S.C. 154(b) by 207 days.

(21) Appl. No.: 17/372,150

(22) Filed: Jul. 9, 2021

(65) Prior Publication Data

US 2022/0156481 A1    May 19, 2022

Related U.S. Application Data

(60) Provisional application No. 63/116,088, filed on Nov. 19, 2020.

(51) Int. Cl.
*G06V 20/69* (2022.01)
*G06F 18/20* (2023.01)
*G06F 18/2431* (2023.01)
*G06F 18/40* (2023.01)
*G06N 3/04* (2023.01)

(52) U.S. Cl.
CPC ........ *G06V 20/698* (2022.01); *G06F 18/2431* (2023.01); *G06F 18/285* (2023.01); *G06F 18/40* (2023.01); *G06N 3/04* (2013.01); *G06V 20/693* (2022.01); *G06V 2201/03* (2022.01)

(58) Field of Classification Search
CPC ............... G06V 20/698; G06V 20/693; G06V 2201/03; G06V 10/764; G06V 20/69; G06F 18/2431; G06F 18/285; G06F 18/40; G06N 3/04; G06N 3/045; G06N 3/048; G06N 3/08
See application file for complete search history.

(56) References Cited

U.S. PATENT DOCUMENTS 8,244,651 B1    8/2012    Lin
2017/0091528 A1*  3/2017  Savvides .............. G06V 20/698
(Continued)

FOREIGN PATENT DOCUMENTS

CN    109102515 A    12/2018
WO   WO-2020004101 A1    1/2020

OTHER PUBLICATIONS

Evidential Deep Learning, Sensoy et al, 2018 (Year: 2018).*
(Continued)

*Primary Examiner* — Jianxun Yang
(74) *Attorney, Agent, or Firm* — Haverstock & Owens, A Law Corporation

(57) ABSTRACT

An efficient and robust high-speed neural networks for cell image classification is described herein. The neural networks for cell image classification utilize a difference between soft-max scores to determine if a cell is ambiguous or not. If the cell is ambiguous, then the class is classified in a pseudo class, and if the cell is not ambiguous, the cell is classified in the class corresponding to the highest class score. The neural networks for cell image classification enable a high speed, high accuracy and high recall implementation.

21 Claims, 6 Drawing Sheets

(56) References Cited

U.S. PATENT DOCUMENTS

| | | | |
|---|---|---|---|
| 2019/0266513 A1* | 8/2019 | Eban | G06N 20/00 |
| 2020/0251183 A1* | 8/2020 | Kashefhaghighi | G16B 40/00 |
| 2020/0272864 A1 | 8/2020 | Faust | |
| 2020/0357516 A1 | 11/2020 | Kirby | |
| 2021/0173841 A1* | 6/2021 | Kotnis | G06F 16/322 |

OTHER PUBLICATIONS

Deep Learning-chap9, Goodfellow et al, 2016; https://www.deeplearningbook.org/ (Year: 2016).*

CNN-Intro to Pooling Layer, GeeksforGeeks, Apr. 2020; https://web.archive.org/web/20200418122906/https://www.geeksforgeeks.org/cnn-introduction-to-pooling-layer/ (Year: 2020).*

Julian Riba et al., "Single-Cell Dispensing and 'Real-Time' Cell Classification Using Convolutional Neural Networks for Higher Efficiency in Single-Cell Cloning", Scientific Reports 10:1193 (2020), 9 pages.

Caleb Vununu et al., "A Deep Feature Learning Scheme for Counting the Cells in Microscopy Data", 2018 IEEE International Conference on Electronics and Communication Engineering—(ICECE), pp. 22-26, (2018).

* cited by examiner

EFFICIENT AND ROBUST HIGH-SPEED NEURAL NETWORKS FOR CELL IMAGE CLASSIFICATION

CROSS-REFERENCE TO RELATED APPLICATION(S)

This application claims priority under 35 U.S.C. § 119(e) of the U.S. Provisional Patent Application Ser. No. 63/116,088, filed Nov. 19, 2020 and titled, "EFFICIENT AND ROBUST HIGH-SPEED NEURAL NETWORKS FOR CELL IMAGE CLASSIFICATION," which is hereby incorporated by reference in its entirety for all purposes.

FIELD OF THE INVENTION

The present invention relates to cell sorting. More specifically, the present invention relates to image based cell sorting.

BACKGROUND OF THE INVENTION

Cell image analysis plays a more and more important role in biological and medical study, but existing methods cannot be utilized for real-time high speed applications, such as cell sorting. A deep neural network is usually built to achieve high accuracy classification; however, its complexity limits its usage in real-time applications that require very high speed.

SUMMARY OF THE INVENTION

An efficient and robust high-speed neural networks for cell image classification is described herein. The neural networks for cell image classification utilize a difference between soft-max scores to determine if a cell is ambiguous or not. If the cell is ambiguous, then the class is classified in a pseudo class, and if the cell is not ambiguous, the cell is classified in the class corresponding to the highest class score. The neural networks for cell image classification enable a high speed, high accuracy and high recall implementation.

The state-of-the-art method is based on boosting and manually engineered features. Deep learning-based methods (e.g., DeepFlow, ResNet) have also been proposed. All of those existing methods do not meet the speed requirements of typical applications including image activated cell sorting.

In one aspect, a method comprises processing a cell image using a neural network including generating a plurality of soft-max scores each corresponding to a class, comparing a highest soft-max score and second highest soft-max score of the plurality of soft-max scores to determine a difference, classifying the cell image in a pseudo-class when the difference is below a threshold and classifying the cell image in the class corresponding to the highest soft-max score when the difference is equal to or above the threshold. The neural network comprises two convolutional layers and one fully connected layer. The soft-max score is between 0 and 1, inclusive. The threshold is set based on historical information to generate a high precision and a high recall. The threshold is determined by machine learning and artificial intelligence. The threshold is manually determined by a user. The method further comprises acquiring the cell image.

In another aspect, an apparatus comprises a non-transitory memory for storing an application, the application for: processing a cell image using a neural network including generating a plurality of soft-max scores each corresponding to a class, comparing a highest soft-max score and second highest soft-max score of the plurality of soft-max scores to determine a difference, classifying the cell image in a pseudo-class when the difference is below a threshold and classifying the cell image in the class corresponding to the highest soft-max score when the difference is equal to or above the threshold and a processor coupled to the memory, the processor configured for processing the application. The neural network comprises two convolutional layers and one fully connected layer. The soft-max score is between 0 and 1, inclusive. The threshold is set based on historical information to generate a high precision and a high recall. The threshold is determined by machine learning and artificial intelligence. The threshold is manually determined by a user. The apparatus is further for acquiring the cell image.

In another aspect, a system comprises a first device configured for acquiring a cell image and a second device configured for: soft-max scores each corresponding to a class, comparing a highest soft-max score and second highest soft-max score of the plurality of soft-max scores to determine a difference, classifying the cell image in a pseudo-class when the difference is below a threshold and classifying the cell image in the class corresponding to the highest soft-max score when the difference is equal to or above the threshold. The neural network comprises two convolutional layers and one fully connected layer. The soft-max score is between 0 and 1, inclusive. The threshold is set based on historical information to generate a high precision and a high recall. The threshold is determined by machine learning and artificial intelligence. The threshold is manually determined by a user.

DETAILED DESCRIPTION OF THE PREFERRED EMBODIMENT

A shallow two-convolutional-layer neural network architecture has been designed and established suitable for very high-speed real-time cell image classification. In addition, the algorithm is able to minimize the common trade-off pitfall between precision and recall to achieve high precision with high recall.

The neural networks with cell image classification address unmet needs of many cell image classification applications—mainly two key requirements: high accuracy and high speed. The existing classical machine learning-based method (e.g., boosting, svm with manually engineered features) and deep learning-based method cannot met the speed requirements. The method described herein not only runs very fast but also achieves high accuracy because of the shallow neural network architecture designed by architecture search techniques and the novel precision-recall trade-off module.

The neural networks with cell image classification are able to be used in image-based flow cytometry systems, which involves high throughput and high accuracy. The neural networks with cell image classification are also able to be used in other cell image analysis systems, such as cell image organization, retrieval and more.

Figure 1:
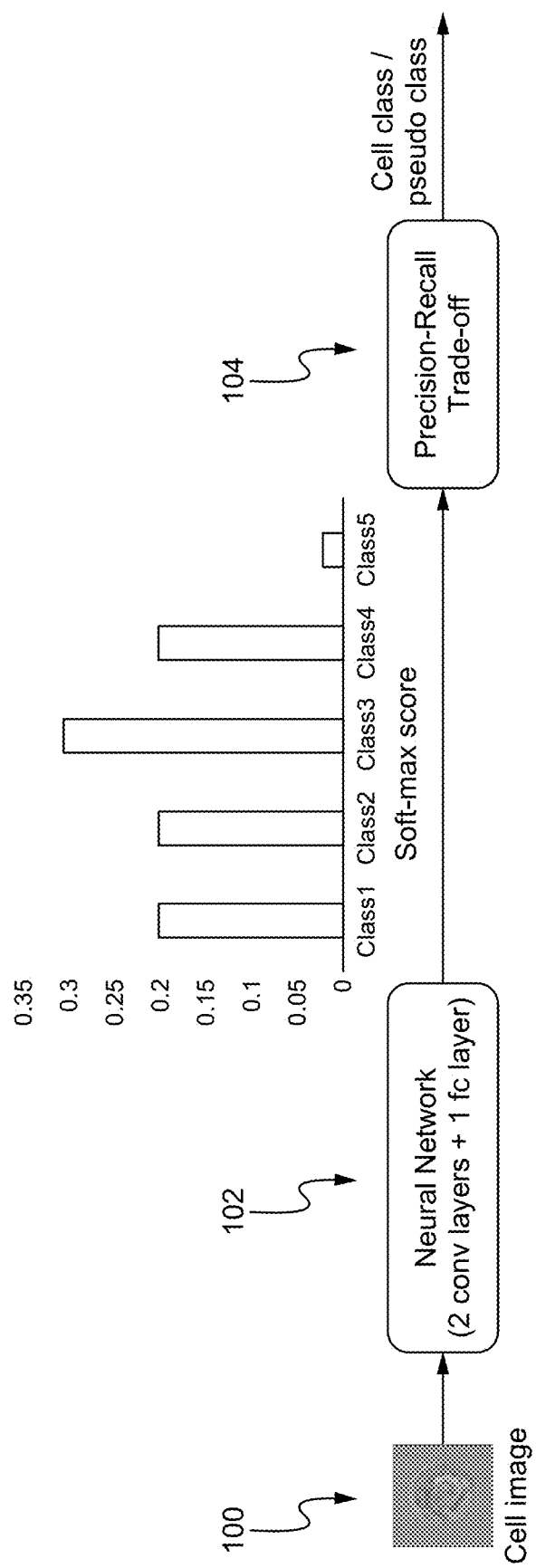
FIG. 1 illustrates a flowchart of a method of implementing neural networks for cell image classification according to some embodiments.

FIG. 1 illustrates a flowchart of a method of implementing neural networks for cell image classification according to some embodiments. In the step 100, a cell image is acquired.

The cell image is able to be acquired in any manner such as using a system including a microscope and a camera.

In the step 102, a neural network is used to process the cell image. The neural network is able to be any type of neural network, such as a neural network with two convolutional layers and one fully connected layer. The neural network generates a soft-max score which is a classification score for the cell. For example, the softmax score is a number from 0 to 1, inclusive, where a number closer to 1 for a class means the cell is more likely in that class, and a number closer to 0 for a class means the cell is less likely in that class. Multiple soft-max scores (e.g., one score for each class) are able to be generated for a single cell. For example, a cell is analyzed by the neural network, and a soft-max score is generated for all 5 classes. For example, when classifying a white blood cell, there are 5 classes/classifications (e.g., neutrophil, eosinophil, basophil, monocyte, lymphocyte). Scores from one exemplary image for different classes sum up to 1. For example, [0.5, 0.2, 0.1, 0.1, 0.1] are valid scores for 5 classes. The soft-max score is a standard calculation (soft-max function) to determine predicted probabilities of each class of multiple classes. An exemplary soft-max function includes:

$$p_{i,c} = \frac{e^{l_{i,c}}}{\sum_{c'=1}^{3} e^{l_{i,c'}}}, c = 1, \ldots, 3$$

where $l_{i,c}$ is the logit for each class c, for example i.

In the step 104, precision-recall tradeoff is applied to achieve high speed and high accuracy, which classifies the cell in a class or a pseudo class. As described herein, instead of merely classifying the cell based on the highest soft-max score, the two highest soft-max scores are compared (e.g., highest score minus second highest score), and if the difference between the two highest soft-max scores is equal to or above a threshold, then the cell (image) is classified in the class with the highest soft-max score. If the difference is less than the threshold, then the cell (image) is classified in a pseudo class. In some embodiments, the order of the steps is modified. In some embodiments, fewer or additional steps are implemented.

Figure 2:
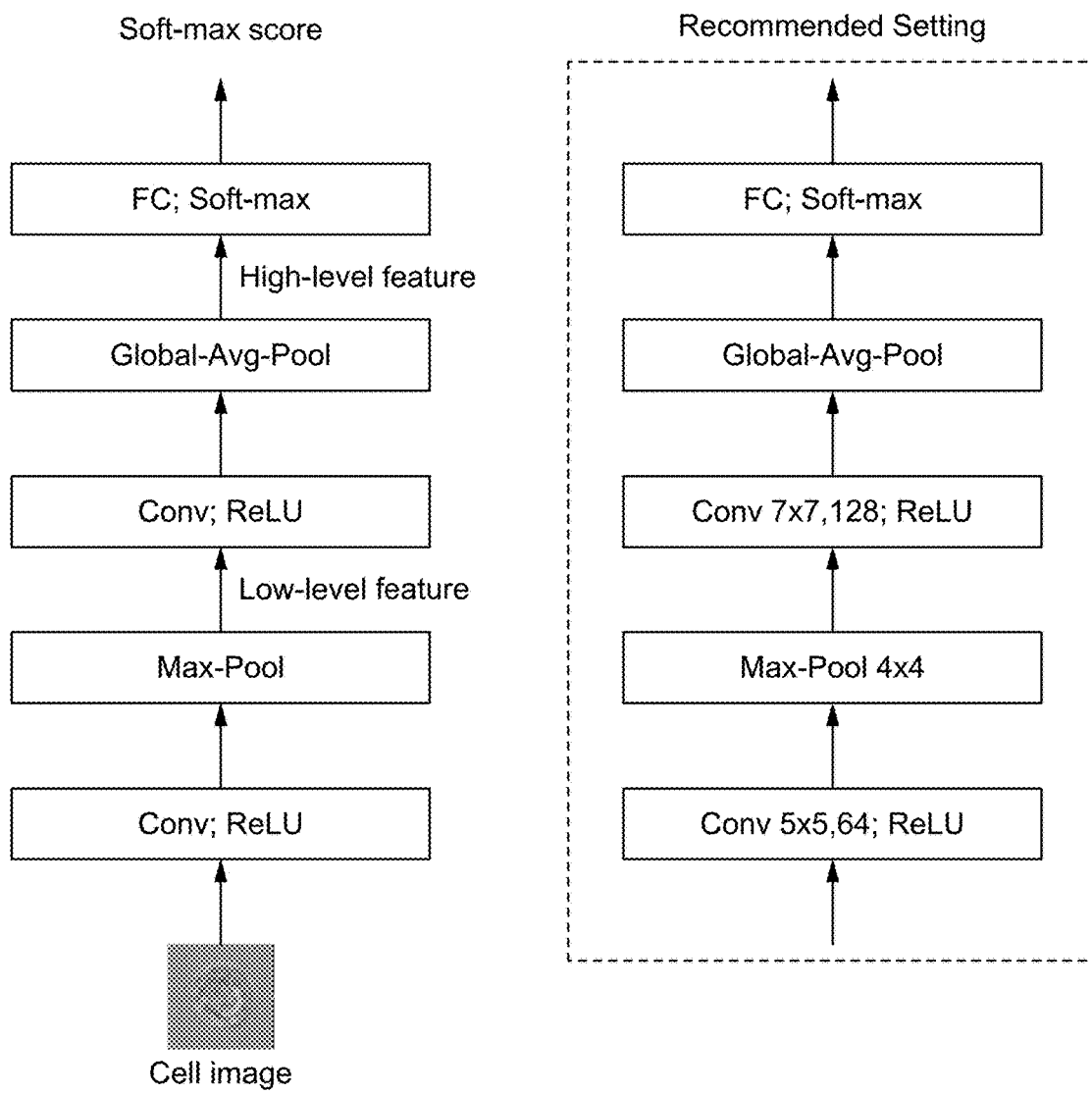
FIG. 2 illustrates a diagram of the neural network architecture according to some embodiments.

FIG. 2 illustrates a diagram of the neural network architecture according to some embodiments. The convolutional neural network receives the cell image input. The convolutional neural network uses a rectified linear activation function (ReLU) which outputs the input directly if positive; otherwise, the output is zero. Then, maximum pooling is used to downsample a 2×2 data to one value, which is the maximum value which is a representative picture of the 2×2. There is another layer of a convolutional neural network and ReLU. Then, global average pooling is implemented.

Finally, a soft maximum (soft-max) score is achieved. The soft-max is a normalized score similar to a probability. The soft-max score is able to be used as a confidence level threshold. The soft-max score is a number from 0 to 1, inclusive. The soft-max score is a standard output of any multi-class classifier.

Figure 3:
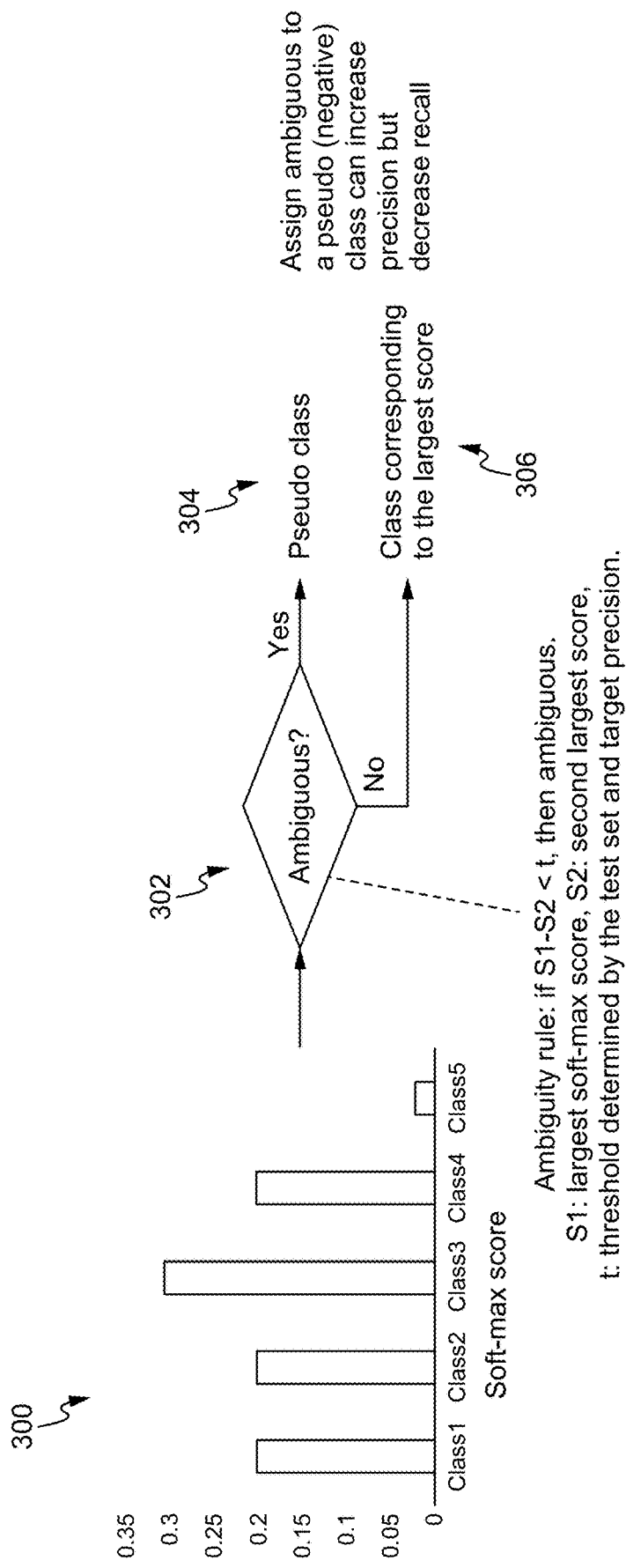
FIG. 3 illustrates a flowchart of trading recall for precision based on a soft-max score according to some embodiments.

FIG. 3 illustrates a flowchart of trading recall for precision based on a soft-max score according to some embodiments. In the step 300, the soft-max score is generated and/or received. In the step 302, it is determined if the classification based on the soft-max score determination is ambiguous. If $S_1-S_2<t$, then the determination is ambiguous. In the equation, $S_1$ is the largest soft-max score, $S_2$ is the second largest soft-max score, and t is the threshold determined by a test set and target precision. For example, based on previous testing and a desired precision, the threshold is able to be determined to achieve the desired precision (e.g., previous tests/historical data determined a threshold of 0.5 resulted in 90% precision, but a threshold of 0.6 resulted in 99% precision, which is the goal for that example). In another example, the threshold is able to be determined and set by a user. In another example, the threshold is able to be adjusted using learning and artificial intelligence. If it is ambiguous which class the cell is in, then the cell is classified in a pseudo class, in the step 304. If it is not ambiguous which class the cell belongs to, then the cell is classified in the class corresponding to the largest score, in the step 306. In some embodiments, the order of the steps is modified. In some embodiments, fewer or additional steps are implemented.

Figure 4:
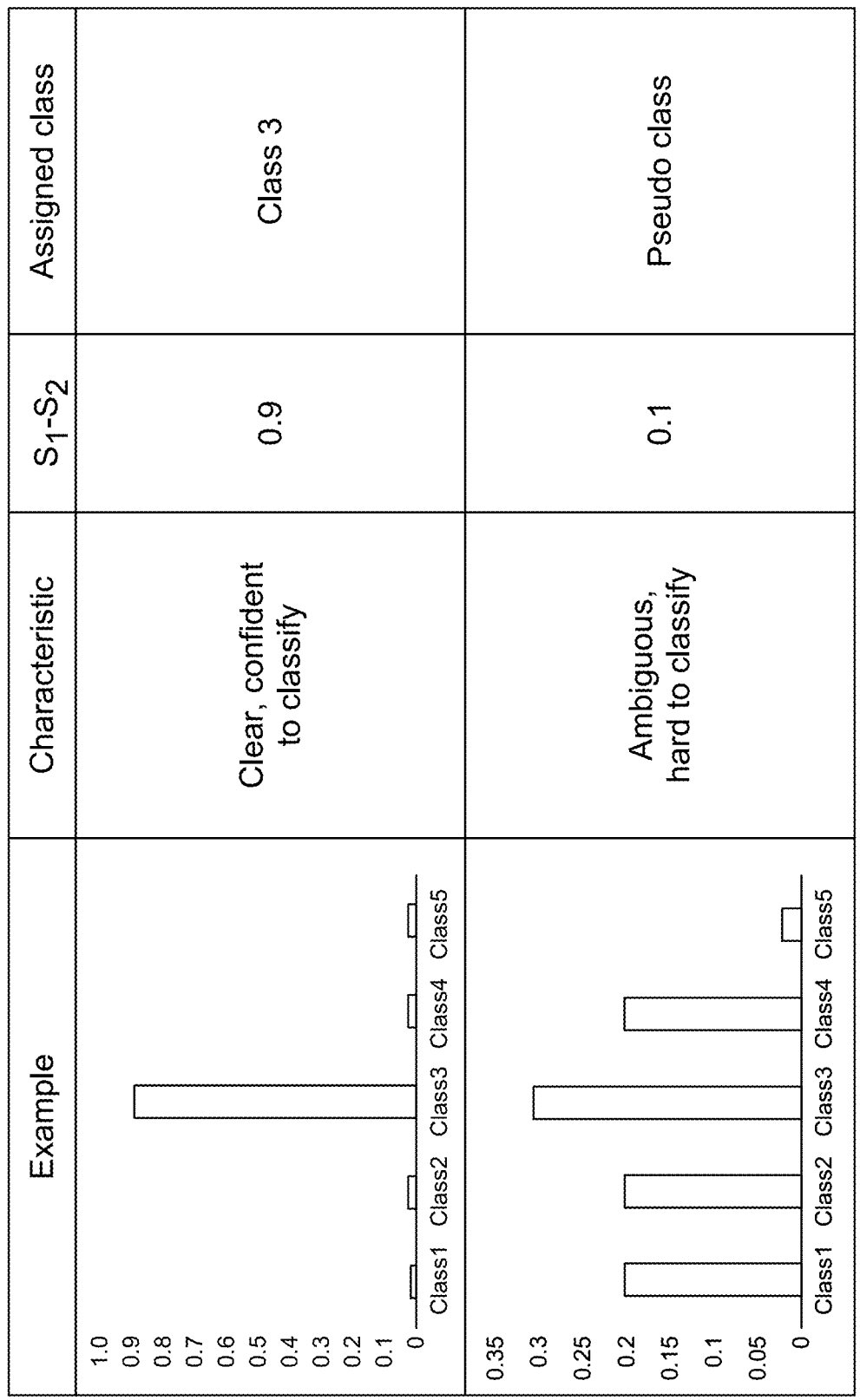
FIG. 4 illustrates a chart of exemplary classifications according to some embodiments.

FIG. 4 illustrates a chart of exemplary classifications according to some embodiments. In the first row below the headings, the exemplary data has a $S_1-S_2$ difference of 0.9 which is very high (and above the threshold), so it is clear and the system is confident to be able to classify the cell (in class 3, for example). In the second row, the exemplary data has a $S_1-S_2$ difference of 0.1 which is very low, so it is ambiguous and hard to classify, and the cell is classified in a pseudo class. By rejecting cells where the difference between the soft-max scores is low, the precision of around 99%, and 98.5% recall is able to be achieved.

Figure 5:
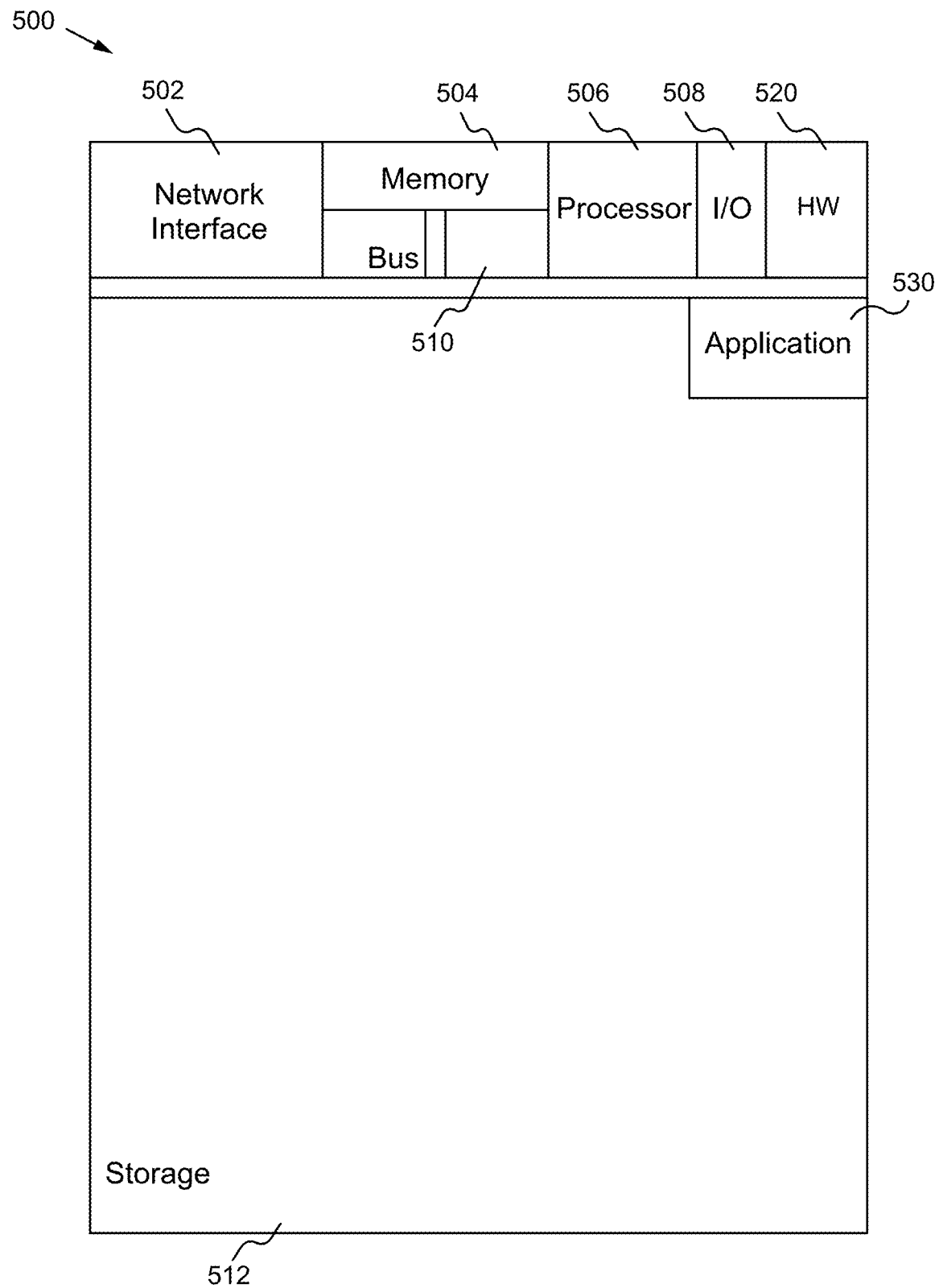
FIG. 5 shows a block diagram of an exemplary computing device configured to implement a neural network for cell image classification according to some embodiments.

FIG. 5 shows a block diagram of an exemplary computing device configured to implement a neural network for cell image classification according to some embodiments. The computing device 500 is able to be used to acquire, store, compute, process, communicate and/or display information such as images and videos. The computing device 500 is able to implement any of the neural network for cell image classification aspects. In general, a hardware structure suitable for implementing the computing device 500 includes a network interface 502, a memory 504, a processor 506, I/O device(s) 508, a bus 510 and a storage device 512. The choice of processor is not critical as long as a suitable processor with sufficient speed is chosen. The memory 504 is able to be any conventional computer memory known in the art. The storage device 512 is able to include a hard drive, CDROM, CDRW, DVD, DVDRW, High Definition disc/drive, ultra-HD drive, flash memory card or any other storage device. The computing device 500 is able to include one or more network interfaces 502. An example of a network interface includes a network card connected to an Ethernet or other type of LAN. The I/O device(s) 508 are able to include one or more of the following: keyboard, mouse, monitor, screen, printer, modem, touchscreen, button interface and other devices. Neural network application(s) 530 used to implement the neural network(s) for cell image classification are likely to be stored in the storage device 512 and memory 504 and processed as applications are typically processed. More or fewer components shown in FIG. 5 are able to be included in the computing device 500. In some embodiments, neural network hardware 520 is included. Although the computing device 500 in FIG. 5 includes applications 530 and hardware 520 for the neural network for cell image classification, the neural network for cell image classification is able to be implemented on a computing device in hardware, firmware, software or any combination thereof. For example, in some embodiments, the neural network applications 530 are programmed in a memory and executed using a processor. In another example, in some embodiments, the neural network hardware 520 is programmed hardware logic including gates specifically designed to implement the neural network for cell image classification.

In some embodiments, the neural network application(s) 530 include several applications and/or modules. In some embodiments, modules include one or more sub-modules as well. In some embodiments, fewer or additional modules are able to be included.

Examples of suitable computing devices include a microscope, a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, a home entertainment system, an augmented reality device, a virtual reality device, smart jewelry (e.g., smart watch), a vehicle (e.g., a self-driving vehicle) or any other suitable computing device.

Figure 6:
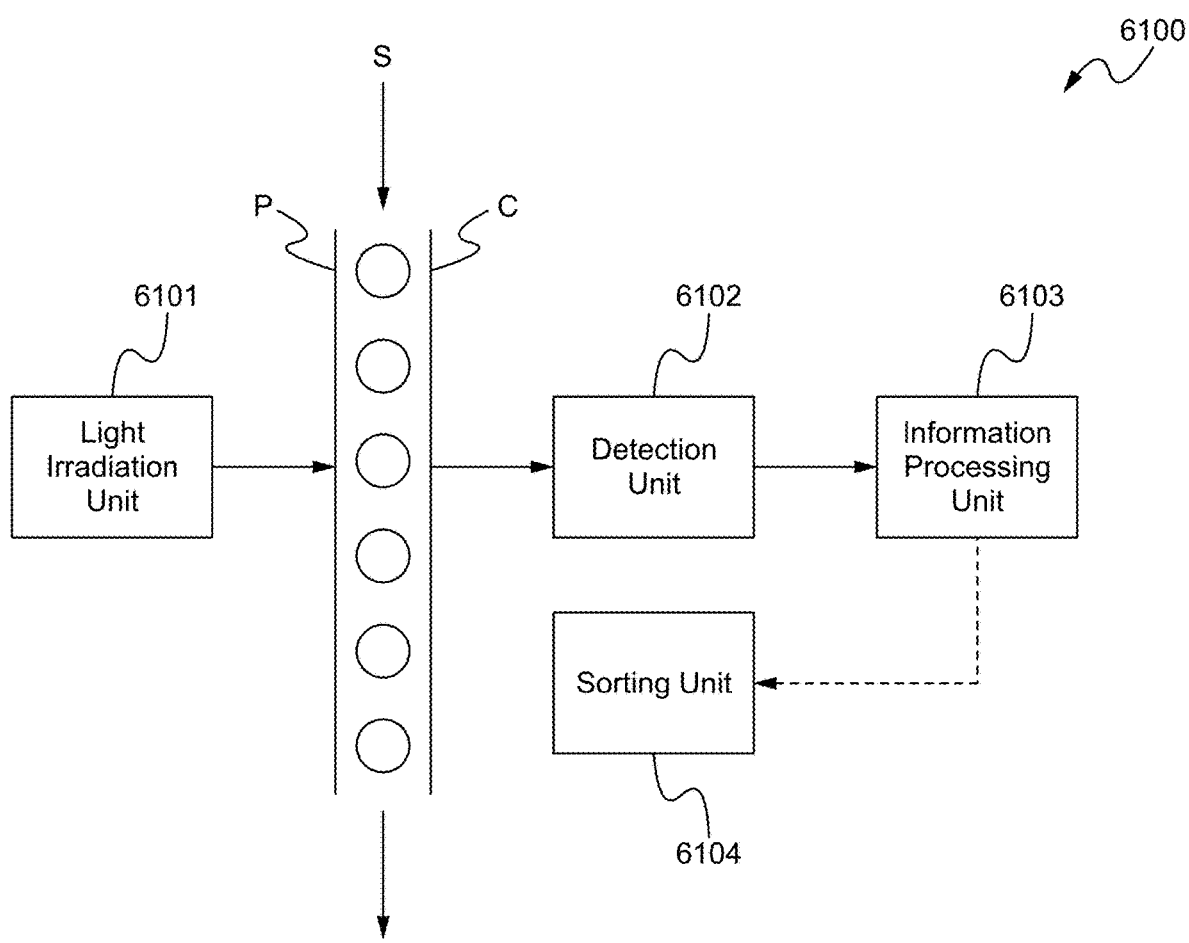
FIG. 6 illustrates a diagram schematically showing the overall configuration of a biological sample analyzer according to some embodiments.

FIG. 6 illustrates a diagram schematically showing the overall configuration of a biological sample analyzer according to some embodiments.

FIG. 6 shows an example configuration of a biological sample analyzer of the present disclosure. A biological sample analyzer 6100 shown in FIG. 6 includes: a light irradiation unit 6101 that irradiates a biological sample S flowing in a flow channel C with light; a detection unit 6102 that detects light generated by irradiating the biological sample S; and an information processing unit 6103 that processes information about the light detected by the detection unit. The biological sample analyzer 6100 is a flow cytometer or an imaging cytometer, for example. The biological sample analyzer 6100 may include a sorting unit 6104 that sorts out specific biological particles P in a biological sample. The biological sample analyzer 6100 including the sorting unit is a cell sorter, for example.

(Biological Sample)

The biological sample S may be a liquid sample containing biological particles. The biological particles are cells or non-cellular biological particles, for example. The cells may be living cells, and more specific examples thereof include blood cells such as erythrocytes and leukocytes, and germ cells such as sperms and fertilized eggs. Also, the cells may be those directly collected from a sample such as whole blood, or may be cultured cells obtained after culturing. The non-cellular biological particles are extracellular vesicles, or particularly, exosomes and microvesicles, for example. The biological particles may be labeled with one or more labeling substances (such as a dye (particularly, a fluorescent dye) and a fluorochrome-labeled antibody). Note that particles other than biological particles may be analyzed by the biological sample analyzer of the present disclosure, and beads or the like may be analyzed for calibration or the like.

(Flow Channel)

The flow channel C is designed so that a flow of the biological sample S is formed. In particular, the flow channel C may be designed so that a flow in which the biological particles contained in the biological sample are aligned substantially in one row is formed. The flow channel structure including the flow channel C may be designed so that a laminar flow is formed. In particular, the flow channel structure is designed so that a laminar flow in which the flow of the biological sample (a sample flow) is surrounded by the flow of a sheath liquid is formed. The design of the flow channel structure may be appropriately selected by a person skilled in the art, or a known one may be adopted. The flow channel C may be formed in a flow channel structure such as a microchip (a chip having a flow channel on the order of micrometers) or a flow cell. The width of the flow channel C is 1 mm or smaller, or particularly, may be not smaller than 10 μm and not greater than 1 mm. The flow channel C and the flow channel structure including the flow channel C may be made of a material such as plastic or glass.

The biological sample analyzer of the present disclosure is designed so that the biological sample flowing in the flow channel C, or particularly, the biological particles in the biological sample are irradiated with light from the light irradiation unit 6101. The biological sample analyzer of the present disclosure may be designed so that the irradiation point of light on the biological sample is located in the flow channel structure in which the flow channel C is formed, or may be designed so that the irradiation point is located outside the flow channel structure. An example of the former case may be a configuration in which the light is emitted onto the flow channel C in a microchip or a flow cell. In the latter case, the biological particles after exiting the flow channel structure (particularly, the nozzle portion thereof) may be irradiated with the light, and a flow cytometer of a jet-in-air type can be adopted, for example.

(Light Irradiation Unit)

The light irradiation unit 6101 includes a light source unit that emits light, and a light guide optical system that guides the light to the irradiation point. The light source unit includes one or more light sources. The type of the light source(s) is a laser light source or an LED, for example. The wavelength of light to be emitted from each light source may be any wavelength of ultraviolet light, visible light, and infrared light. The light guide optical system includes optical components such as beam splitters, mirrors, or optical fibers, for example. The light guide optical system may also include a lens group for condensing light, and includes an objective lens, for example. There may be one or more irradiation points at which the biological sample and light intersect. The light irradiation unit 6101 may be designed to collect light emitted onto one irradiation point from one light source or different light sources.

(Detection Unit)

The detection unit 6102 includes at least one photodetector that detects light generated by emitting light onto biological particles. The light to be detected may be fluorescence or scattered light (such as one or more of the following: forward scattered light, backscattered light, and side scattered light), for example. Each photodetector includes one or more light receiving elements, and has a light receiving element array, for example. Each photodetector may include one or more photomultiplier tubes (PMTs) and/or photodiodes such as APDs and MPPCs, as the light receiving elements. The photodetector includes a PMT array in which a plurality of PMTs is arranged in a one-dimensional direction, for example. The detection unit

6102 may also include an image sensor such as a CCD or a CMOS. With the image sensor, the detection unit 6102 can acquire an image (such as a bright-field image, a dark-field image, or a fluorescent image, for example) of biological particles.

The detection unit 6102 includes a detection optical system that causes light of a predetermined detection wavelength to reach the corresponding photodetector. The detection optical system includes a spectroscopic unit such as a prism or a diffraction grating, or a wavelength separation unit such as a dichroic mirror or an optical filter. The detection optical system is designed to disperse the light generated by light irradiation to biological particles, for example, and detect the dispersed light with a larger number of photodetectors than the number of fluorescent dyes with which the biological particles are labeled. A flow cytometer including such a detection optical system is called a spectral flow cytometer. Further, the detection optical system is designed to separate the light corresponding to the fluorescence wavelength band of a specific fluorescent dye from the light generated by the light irradiation to the biological particles, for example, and cause the corresponding photodetector to detect the separated light.

The detection unit 6102 may also include a signal processing unit that converts an electrical signal obtained by a photodetector into a digital signal. The signal processing unit may include an A/D converter as a device that performs the conversion. The digital signal obtained by the conversion performed by the signal processing unit can be transmitted to the information processing unit 6103. The digital signal can be handled as data related to light (hereinafter, also referred to as "light data") by the information processing unit 6103. The light data may be light data including fluorescence data, for example. More specifically, the light data may be data of light intensity, and the light intensity may be light intensity data of light including fluorescence (the light intensity data may include feature quantities such as area, height, and width).

(Information Processing Unit)

The information processing unit 6103 includes a processing unit that performs processing of various kinds of data (light data, for example), and a storage unit that stores various kinds of data, for example. In a case where the processing unit acquires the light data corresponding to a fluorescent dye from the detection unit 6102, the processing unit can perform fluorescence leakage correction (a compensation process) on the light intensity data. In the case of a spectral flow cytometer, the processing unit also performs a fluorescence separation process on the light data, and acquires the light intensity data corresponding to the fluorescent dye. The fluorescence separation process may be performed by an unmixing method disclosed in JP 2011-232259 A, for example. In a case where the detection unit 6102 includes an image sensor, the processing unit may acquire morphological information about the biological particles, on the basis of an image acquired by the image sensor. The storage unit may be designed to be capable of storing the acquired light data. The storage unit may be designed to be capable of further storing spectral reference data to be used in the unmixing process.

In a case where the biological sample analyzer 6100 includes the sorting unit 6104 described later, the information processing unit 6103 can determine whether to sort the biological particles, on the basis of the light data and/or the morphological information. The information processing unit 6103 then controls the sorting unit 6104 on the basis of the result of the determination, and the biological particles can be sorted by the sorting unit 6104.

The information processing unit 6103 may be designed to be capable of outputting various kinds of data (such as light data and images, for example). For example, the information processing unit 6103 can output various kinds of data (such as a two-dimensional plot or a spectrum plot, for example) generated on the basis of the light data. The information processing unit 6103 may also be designed to be capable of accepting inputs of various kinds of data, and accepts a gating process on a plot by a user, for example. The information processing unit 6103 may include an output unit (such as a display, for example) or an input unit (such as a keyboard, for example) for performing the output or the input.

The information processing unit 6103 may be designed as a general-purpose computer, and may be designed as an information processing device that includes a CPU, a RAM, and a ROM, for example. The information processing unit 6103 may be included in the housing in which the light irradiation unit 6101 and the detection unit 6102 are included, or may be located outside the housing. Further, the various processes or functions to be executed by the information processing unit 6103 may be realized by a server computer or a cloud connected via a network.

(Sorting Unit)

The sorting unit 6104 performs sorting of biological particles, in accordance with the result of determination performed by the information processing unit 6103. The sorting method may be a method by which droplets containing biological particles are generated by vibration, electric charges are applied to the droplets to be sorted, and the traveling direction of the droplets is controlled by an electrode. The sorting method may be a method for sorting by controlling the traveling direction of biological particles in the flow channel structure. The flow channel structure has a control mechanism based on pressure (injection or suction) or electric charge, for example. An example of the flow channel structure may be a chip (the chip disclosed in JP 2020-76736 A, for example) that has a flow channel structure in which the flow channel C branches into a recovery flow channel and a waste liquid flow channel on the downstream side, and specific biological particles are collected in the recovery flow channel.

To utilize the neural network for cell image classification described herein, devices such as a microscope with a camera are used to acquire content, and a device is able to process the acquired content. The neural network for cell image classification is able to be implemented with user assistance or automatically without user involvement.

In operation, the neural network for cell image classification enables high accuracy, high speed, and high recall. The high accuracy is able to be approximately 99%, the high speed includes classifying 2500 images per second, and the high recall is approximately 99%. Other implementations do not match the accuracy, speed and/or recall.

In terms of accuracy for cytometry, the accuracy threshold is typically around 99%, meaning a system should be correct 99% of the time for it to be considered accurate. In an exemplary implementation, there was 99% precision and a 98.5% recall on a publicly available dataset. In terms of speed, the system processes 2500 images per second (less than 0.4 ms latency), for example, on a Titan X GPU.

Some Embodiments of Efficient and Robust
High-Speed Neural Networks for Cell Image
Classification 1. A method comprising:
  processing a cell image using a neural network including generating a plurality of soft-max scores each corresponding to a class;
  comparing a highest soft-max score and second highest soft-max score of the plurality of soft-max scores to determine a difference;
  classifying the cell image in a pseudo-class when the difference is below a threshold; and
  classifying the cell image in the class corresponding to the highest soft-max score when the difference is equal to or above the threshold.
2. The method of clause 1 wherein the neural network comprises two convolutional layers and one fully connected layer.
3. The method of clause 1 wherein the soft-max score is between 0 and 1, inclusive.
4. The method of clause 1 wherein the threshold is set based on historical information to generate a high precision and a high recall.
5. The method of clause 1 wherein the threshold is determined by machine learning and artificial intelligence.
6. The method of clause 1 wherein the threshold is manually determined by a user.
7. The method of clause 1 further comprising acquiring the cell image.
8. An apparatus comprising:
  a non-transitory memory for storing an application, the application for:
    processing a cell image using a neural network including generating a plurality of soft-max scores each corresponding to a class;
    comparing a highest soft-max score and second highest soft-max score of the plurality of soft-max scores to determine a difference;
    classifying the cell image in a pseudo-class when the difference is below a threshold; and
    classifying the cell image in the class corresponding to the highest soft-max score when the difference is equal to or above the threshold; and
  a processor coupled to the memory, the processor configured for processing the application.
9. The apparatus of clause 8 wherein the neural network comprises two convolutional layers and one fully connected layer.
10. The apparatus of clause 8 wherein the soft-max score is between 0 and 1, inclusive.
11. The apparatus of clause 8 wherein the threshold is set based on historical information to generate a high precision and a high recall.
12. The apparatus of clause 8 wherein the threshold is determined by machine learning and artificial intelligence.
13. The apparatus of clause 8 wherein the threshold is manually determined by a user.
14. The apparatus of clause 8 wherein the apparatus is further for acquiring the cell image.
15. A system comprising:
  a first device configured for acquiring a cell image; and
  a second device configured for:
    processing the cell image using a neural network including generating a plurality of soft-max scores each corresponding to a class;
    comparing a highest soft-max score and second highest soft-max score of the plurality of soft-max scores to determine a difference;
    classifying the cell image in a pseudo-class when the difference is below a threshold; and
    classifying the cell image in the class corresponding to the highest soft-max score when the difference is equal to or above the threshold.
16. The system of clause 15 wherein the neural network comprises two convolutional layers and one fully connected layer.
17. The system of clause 15 wherein the soft-max score is between 0 and 1, inclusive.
18. The system of clause 15 wherein the threshold is set based on historical information to generate a high precision and a high recall.
19. The system of clause 15 wherein the threshold is determined by machine learning and artificial intelligence.
20. The system of clause 15 wherein the threshold is manually determined by a user.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:
1. A method comprising:
  irradiating a biological sample flowing in a flow channel with light;
  detecting light generated by irradiating the biological sample;
  processing a cell image of the biological sample using a neural network including generating a plurality of soft-max scores each corresponding to a class;
  sorting the plurality of soft-max scores from highest to lowest;
  comparing a highest soft-max score and second highest soft-max score of the plurality of soft-max scores to determine a difference;
  classifying the cell image in a pseudo-class when the difference is below a threshold; and
  classifying the cell image in the class corresponding to the highest soft-max score when the difference is equal to or above the threshold.
2. The method of claim 1 wherein the neural network comprises two convolutional layers and one fully connected layer.
3. The method of claim 1 wherein the soft-max score is between 0 and 1, inclusive.
4. The method of claim 1 wherein the threshold is set based on historical information to generate a high precision and a high recall.
5. The method of claim 1 wherein the threshold is determined by machine learning and artificial intelligence.
6. The method of claim 1 wherein the threshold is manually determined by a user.
7. The method of claim 1 further comprising acquiring the cell image.
8. An apparatus comprising:
  a light irradiation unit configured to irradiate a biological sample flowing in a flow channel with light;

a detection unit configured to detect light generated by irradiating the biological sample;

a non-transitory memory for storing an application, the application for:

processing a cell image of the biological sample using a neural network including generating a plurality of soft-max scores each corresponding to a class;

sorting the plurality of soft-max scores from highest to lowest;

comparing a highest soft-max score and second highest soft-max score of the plurality of soft-max scores to determine a difference;

classifying the cell image in a pseudo-class when the difference is below a threshold; and classifying the cell image in the class corresponding to the highest soft-max score when the difference is equal to or above the threshold; and a processor coupled to the memory, the processor configured for processing the application.

9. The apparatus of claim 8 wherein the neural network comprises two convolutional layers and one fully connected layer.

10. The apparatus of claim 8 wherein the soft-max score is between 0 and 1, inclusive.

11. The apparatus of claim 8 wherein the threshold is set based on historical information to generate a high precision and a high recall.

12. The apparatus of claim 8 wherein the threshold is determined by machine learning and artificial intelligence.

13. The apparatus of claim 8 wherein the threshold is manually determined by a user.

14. The apparatus of claim 8 wherein the apparatus is further for acquiring the cell image.

15. A system comprising:

a first device configured for acquiring a cell image, wherein the first device further comprises:

a light irradiation unit configured to irradiate a biological sample flowing in a flow channel with light; and a detection unit configured to detect light generated by irradiating the biological sample; and a second device configured for:

processing the cell image using a neural network including generating a plurality of soft-max scores each corresponding to a class;

sorting the plurality of soft-max scores from highest to lowest;

comparing a highest soft-max score and second highest soft-max score of the plurality of soft-max scores to determine a difference;

classifying the cell image in a pseudo-class when the difference is below a threshold; and classifying the cell image in the class corresponding to the highest soft-max score when the difference is equal to or above the threshold.

16. The system of claim 15 wherein the neural network comprises two convolutional layers and one fully connected layer.

17. The system of claim 16 wherein at least one convolutional layer of the two convolutional layers implements a rectified linear activation function and maximum pooling to downsample a 2×2 data to a single value.

18. The system of claim 15 wherein the soft-max score is between 0 and 1, inclusive.

19. The system of claim 15 wherein the threshold is set based on historical information to generate a high precision and a high recall.

20. The system of claim 15 wherein the threshold is determined by machine learning and artificial intelligence.

21. The system of claim 15 wherein the threshold is manually determined by a user.

* * * * *